May 27, 1941. H. L. SCHUG Re. 21,812

ABSORPTION REFRIGERATING APPARATUS

Original Filed March 13, 1939 3 Sheets-Sheet 1

INVENTOR

Howard L. Schug

BY

Harry S. Dinsmore

ATTORNEY

May 27, 1941. H. L. SCHUG Re. 21,812

ABSORPTION REFRIGERATING APPARATUS

Original Filed March 13, 1939 3 Sheets-Sheet 2

INVENTOR

Howard L. Schug

BY

Harry S. Duncan

ATTORNEY

ABSORPTION REFRIGERATING APPARATUS

Original Filed March 13, 1939 3 Sheets-Sheet 3

INVENTOR
Howard L. Schug
BY
Harry S. Dunasser
ATTORNEY

Reissued May 27, 1941 Re. 21,812

UNITED STATES PATENT OFFICE 21,812

ABSORPTION REFRIGERATING APPARATUS

Howard L. Schug, North Canton, Ohio, assignor to The Hoover Company, North Canton, Ohio, a corporation of Ohio Original No. 2,204,233, dated June 11, 1940, Serial No. 261,478, March 13, 1939. Application for reissue November 12, 1940, Serial No. 365,397

9 Claims. (Cl. 62—119.5)

This application is a continuation-in-part of application, Serial No. 25,732, filed June 10, 1935.

This invention relates to continuous absorption refrigerating apparatus of the type in which an inert gas is employed and more particularly to novel means for circulating the inert gas, as well as a novel manner of incorporating a gas circulator in a refrigerating apparatus.

Continuous absorption refrigerating systems in which an inert gas is employed and in which it is circulated by power-driven means such as a fan have been proposed heretofore, but have not been perfected. In order to circulate the inert gas by means of a fan, however, it is necessary to extend the fan shaft through a wall of the apparatus to a driving motor. This presents the disadvantage that the apparatus is liable to leak, especially after the parts which move have become worn. It also presents the problem of providing a structure in which the apparatus will have long life since the bearings for the shaft are apt to corrode especially if subjected to fluids in the system which have a corrosive effect upon the metals employed.

It is one object of the present invention to provide an improved gas circulating means adapted for use in absorption refrigerating systems but in which the disadvantages and the defects cited by way of example hereinabove are overcome.

In absorption refrigerating apparatus using ammonia as a refrigerant, water as the absorbent, and hydrogen or nitrogen as the inert medium, the normal operating pressures are in the neighborhood of from 250# to 300# per square inch. To eliminate leakage from the system under these high pressures, it has been proposed to hermetically seal the moving parts of the medium circulating unit within the walls of the system.

This necessitates either the positioning of the entire motor within the system or in positioning the moving parts of the motor pump unit inside the walls of the system and the positioning of the motor field structure outside the system. In the former case, special precautions must be taken to protect the field windings from the corrosive action of the refrigerant. In the latter case, the walls between the moving parts of the motor and the field structure must be of sufficient strength to withstand the pressures within the system, and at the same time provision must be made for conducting the magnetic flux through the walls of the system without magnetic flux leakage to other parts of the system.

The present invention is concerned with a motors circulator unit wherein the moving parts of the unit are hermetically sealed within the walls of the system and in which the field structure of the motor is positioned outside the walls of the system.

The best path for magnetic lines of force is one made of magnetic material. Furthermore, the interposition of non-magnetic material will substantially confine the flux to the magnetic material or offer resistance to the passage of magnetic flux if positioned in the normal path of the flux. These principles are applied to achieve features of the present invention, as will appear more clearly from a detailed description of the invention hereinbelow.

Absorption refrigerating apparatus using ammonia as a refrigerant and water as the absorbent are usually constructed of heavy steel tubing of sufficient strength to withstand the high pressures within the system. This steel tubing is usually of a highly magnetic material. In associating a motor circulator unit of the present type with such a system, it is necessary to devise some means of extending the field core through the heavy steel tubing and at the same time separate the field structure from the remainder of the steel tubing making up the system walls by means of non-magnetic material of sufficient strength and so secured to the steel tubing making up the system walls as to be capable of withstanding the high pressures within the system.

It is therefore another object of this invention to provide an inert gas circulating unit for a three-fluid absorption refrigerating apparatus in which the moving parts of the circulator unit are hemetically sealed within the walls of the system and the field structure is located outside the system walls. More specifically, it is an object to provide a motor unit in which the field core extends through the tubing forming the system walls or communicates with the interior of said system by a path of magnetic material and is separated from the remainder of the walls of the system by non-magnetic material. The portion of the field core extending through the system walls is secured to the tubing in such a way that it forms a part of the walls of the system, and at the same time provides an efficient path for the magnetic flux excited by the field coils through the walls of the system, so as to exert a moving force to the moving parts of the circulator unit without undue magnetic flux leakage into the remainder of the system walls.

It is another object of this invention to provide an inert gas circulator unit for an absorption refrigerating apparatus in which the moving parts of the circulator unit are hermetically sealed within the walls of the system and the field structure is positioned outside the system walls wherein a portion of the system walls forms both a mechanical and an electrical function.

In an absorption refrigerating apparatus of the type using an inert pressure equalizing medium, it may sometime happen that all of the refrigerant supplied to the evaporator is not evaporated.

It is another object of this invention to provide a mechanical inert gas circulator for an absorption refrigerating apparatus wherein means is provided for draining condensate from the evaporator back into circulation without interfering with the operation of the circulator unit.

It is a further object of the invention to provide gas circulating means which will have long life, which will be practically noiseless, which will have low operating cost, and which can be inexpensively manufactured.

Other objects and advantages reside in certain novel features of the arrangement and construction of parts as will be apparent from the following description taken in connection with the accompanying drawings, in which.

Figure 1:
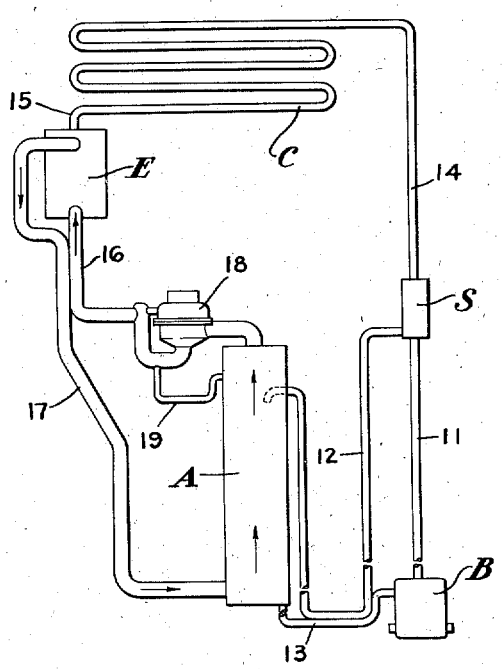
Figure 1 is a diagram of a continuous absorption refrigerating system in which one form of inert medium circulating unit according to the present invention is incorporated.

Referring to the drawings in detail and first to the diagrammatic illustration in Figure 1, it will be seen that a continuous absorption refrigerating system is illustrated as consisting of a boiler B, a vapor separation chamber S, a condenser C, an evaporator E, and an absorber A as essential elements, these devices being connected by a number of conduits to form the complete refrigerating system.

The boiler B is connected to the vapor separation chamber S by means of the conduit 11 which may act as a vapor lift pump to convey both absorption liquid and refrigerant vapor into the vapor separation chamber S. From this chamber the liquid flows into the absorber A through the U-shaped conduit 12. The absorber A may consist merely of a vertical tank with a number of baffle plates therein. The absorption liquid supplied to the upper end thereof by the conduit 12 trickles downwardly over the baffles and leaves the absorber through the conduit 13 through which it flows back to the boiler B. The conduits 12 and 13 may be in heat exchange relation as illustrated.

Refrigerant vapor generated in the boiler B, the conduit 11, or the vapor separation chamber S passes upwardly through a conduit 14, a portion of which may act as a rectifier, and into the condenser C. The condenser C may consist merely of a coil of pipe so arranged that the refrigerant vapor supplied thereto, upon being cooled, condenses and flows into the evaporator E through the conduit 15.

The evaporator E may consist merely of a vertical tank provided with baffle plates. It is connected to the absorber by means of two inert gas conduits designated as 16 and 17, the conduit 16 having a gas circulating device or pump, represented generally by the reference number 18, incorporated therein. As illustrated in Figure 1, the conduit 16 connects the top of the absorber to the bottom of the evaporator. The conduit 17, on the other hand, connects the top of the evaporator to the bottom of the absorber. The conduits 16 and 17 can be in heat exchange relation over a portion of their path as illustrated in Figure 1.

When inert gas is circulated between the evaporator and the absorber, the refrigerant supplied to the evaporator in liquid form evaporates by diffusion into the inert medium to produce the cooling effect and is conveyed into the absorber where it is absorbed by the absorption liquid flowing therethrough and thus returned to the boiler B.

In accordance with known practices, water may be used as the absorption liquid, ammonia as the refrigerant, and hydrogen as the inert gas in the evaporator and the absorber.

In order to prevent any liquid which may not have evaporated in the evaporator E or liquid which may have condensed in conduit 16 from interfering with the proper operation of the gas circulating device 18, a small liquid conduit 19 may be connected to the lower portion of the conduit 16 and to the absorber to drain any liquid from this conduit into the absorber.

Figure 2:
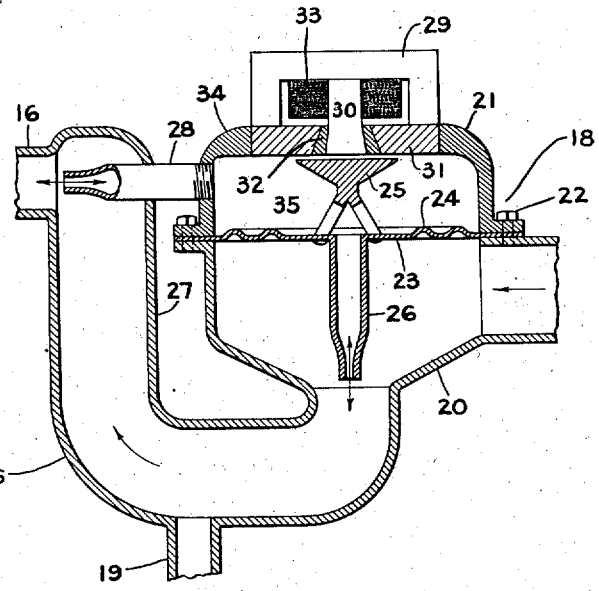
Figure 2 is a vertical cross-sectional view of the gas circulating unit as shown in Figure 1.

The gas circulating unit 18 of Figure 1 is shown in detail in Figure 2. The circulator unit consists of a casing 20, the lower portion of which forms a part of the conduit 16 and the upper portion 21 which is of cup-shaped formation secured to the lower portion by bolts 22. Secured between the upper and lower portions of the casing is a diaphragm 23 with concentric ribs 24 pressed upwardly therein. Secured to the upper side of the diaphragm 23 is an armature 25 and integrally secured to the bottom of the diaphragm is a jet nozzle 26. Extending laterally from the upper portion 21 of the casing 20 and through the walls of the upwardly extending portions 27 of the tube 16 is a second jet nozzle 28.

Secured to the upper portion 21 of the casing 20 is a field core 29 in the form of an annular cup having a leg 30 extending through the upper wall 31 of the casing. The leg 30 of the magnetic core 29 is separated from the remainder of the walls of the casing by an annular insert 32 of non-magnetic material. As shown the leg 30 has a tapered portion at its lower end and the insert 32 is tapered so as to make good contact with the portion 31 of the casing after the field core is assembled so as to withstand the high pressures within the system. If thought desirable, the leg 30 and the non-magnetic insert 32 may be welded in position. The leg 30 of the magnetic core is surrounded by an energizing coil 33. The leg 30 of the magnetic core may be in the form of a stud bolt and the remainder of the core made of laminated sheets of magnetic material, suitably secured against the outer end of the leg 30 so that when alternating current is supplied to the coil 33, a magnetic circuit is set up. The magnetic circuit includes the leg 30, the outer core piece 29, the portion 31 of the casing 21 surrounding the non-magnetic insert 32 and the armature 25.

This casing 21, including section 31, may be a homogeneous material made entirely of steel or other magnetic material. As an alternative construction, only that portion 31 of the casing adjacent non-magnetic insert 32 and extending to the outer ends of the field core 29 may be made of magnetic material, the remainder, as shown at 34, being made of non-magnetic material. In either construction, annulus 32 may comprise any suitable non-magnetic material, although I prefer to use one of the non-magnetic stainless steels. The inserts form an essential part of the refrigeration apparatus wall and are secured in place therein by welding.

As shown in the accompanying drawings, cap 21 forms a portion of the walls of the system and comprises a circular magnetic portion 30, an annular non-magnetic portion 32, an annular portion 31 of magnetic material and a second non-magnetic annular portion 34. With this construction a strong magnetic field is set up through the armature 25 without undue magnetic flux leakage to other parts of the system and in addition, there is no danger of leakage of gases through the walls of the casing member 21 since there is but one opening in this casing tightly sealed by the non-magnetic insert 32 and the leg 30 of the field core.

As the diaphragm 23 is vibrated back and forth by the electro-magnetic means, the volume of the chamber between the diaphragm 23 and the cup member 21 changes slightly. The change of volume in this chamber causes gas to be alternately sucked in and expelled through the nozzles 26 and 28. As the diaphragm moves upwardly, gases are expelled through both nozzles 26 and 28 to create the jet to impel the inert medium through the conduit 16, and when the diaphragm moves downwardly gas enters the chamber between the diaphragm 23 and the cup 21 through both nozzles 26 and 28. The gas sucked into the nozzle mostly enters from a plane at right angles to its longitudinal dimension while that which is expelled moves forward in the direction the nozzle is pointing, and when the diaphragm vibrates at a rather rapid rate, (for example, when the magnet is energized by a 60 cycle, A. C. current) gas leaving the nozzle has the appearance of practically a continuous jet. This jet causes the gas to move forward in the conduit 16 and over the remainder of its circuit as indicated by the arrows in Figure 1.

In the arrangement shown, the cup-shaped member 21 is shown as having considerable volume but this is for the purpose of illustration only and in actual practice the cup is made as shallow as possible in order to keep the volume of the chamber between it and the diaphragm small, since this aids in causing a pumping action through the nozzle even though the diaphragm movement is small. Since the gas is drawn into and expelled from the chamber 35 in which the armature is located, the constant change of gas in this chamber acts to cool the armature.

As can be seen, the inert medium circulator shown provides an electro-mechanical circulator unit in which a portion of the field core extends through the walls of the system adjacent to the movable element which is hermetically sealed within the walls of the system so as to provide a good magnetic circuit for the magnetic flux generated by the field coil 33 and at the same time is separated from the remainder of the system walls by non-magnetic material so as to prevent undue magnetic flux leakage. Since the portions 30 and 31 of the magnetic field core circuit form a part of the system walls, they perform both an electrical and a mechanical function.

Figure 3:
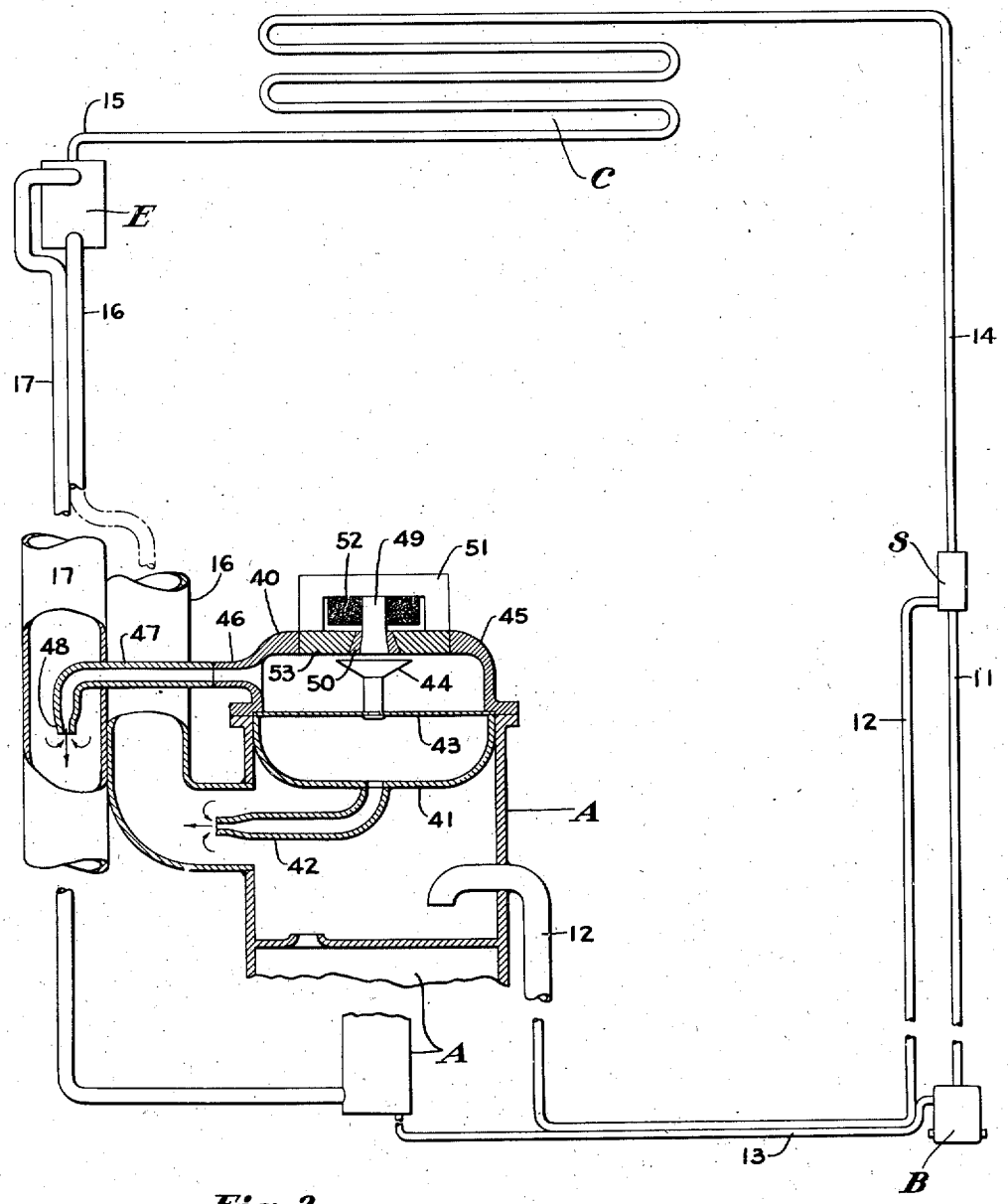
Figure 3 shows the diagram of a continuous absorption refrigerating system of Figure 1 partly broken away to show another form of gas circulator unit incorporated as an integral part of the absorber.

In the embodiment shown in Figure 3, the system is in all respects like that described in relation to Figure 1 with the exception of the inert medium circulating unit, and like reference characters designate like parts of the system with the exception of the circulator unit which is generally designated by the reference character 40. Welded to the upper interior walls of the absorber A is a thin cup-shaped member 41 having a jet tube 42 integrally connected therewith and extending through the walls of the absorber into the tube 16. Welded or otherwise secured to the interior of the cup-shaped member 41 is a diaphragm 43 having an armature 44 riveted or otherwise secured thereto. Welded or otherwise secured to the upper end of the absorber A is a second cup-shaped member 45 having a tube 46 integrally connected therewith and extending laterally therefrom. Welded to the end of the tube 46 and extending through the walls of the tube 17 is a tube 47 with a downwardly extending jet nozzle 48.

The field structure of the circulator unit 40 is in all respects like that described in Figure 2 and comprises a leg 49 extending through the walls of the cup member 45 and separated therefrom by a non-magnetic ring 50. The leg 49 is suitably secured to a yoke 51 of laminated metallic material and an energizing coil 52 surrounds the leg 49. The portion 53 of the cup-shaped member 45 is made of magnetic material and the remainder is made of non-magnetic material such as some of the well known non-magnetic stainless steels.

When the coil 52 is energized, the magnetic circuit includes the yoke 51, the leg 49, the armature 44 and the portion 53 of the walls of the cup member between the outer edges of the yoke 51 and the non-magnetic ring 50.

When the diaphragm 43 is drawn upwardly the volume of the chamber between the diaphragm and the cup-shaped member 45 decreases in volume and forces a jet of gas from the nozzle 48 as shown by the straight arrow, at the same time, the volume of the chamber between the diaphragm 43 and the cup-shaped member 41 increases in volume and gas is drawn into the chamber through the nozzle 42 from the sides of the nozzle as shown by the curved arrows. When the diaphragm 43 resumes its normal position a reverse action takes place, that is, gas moves into the nozzle 48 from the sides as shown by the curved arrows and is forced out of the nozzle 42 as shown by the straight arrow.

A rapid reciprocation of the armature 44 will cause what appears to be a continuous jet of gas from the nozzle 42 into the tube 16 impelling the gas up the tube 16 and at the same time forcing what appears to be a continuous jet of gas from the nozzle 48 forcing the gas downwardly in the tube 17. This will cause a continuous circulation of the inert medium throughout its circuit as long as the coil 52 is energized by an alternating current.

As can be seen the device of Figure 3 provides an electro-mechanical circulator unit for the inert medium of an absorption refrigerating system which is easy and economical to assemble in which the moving parts of the unit are hermetically sealed within the walls of the system and the field structure is located outside the walls of the system with a portion extending through the walls and forming a portion thereof and at the same time forming a portion of the magnetic circuit which is separated from the remainder of the system walls by a non-magnetic insert so as to avoid undue magnetic flux leakage.

As in the case of the modification of Figure 2, the leg 49 of the field core and the non-magnetic ring 50 may be welded in place.

Figure 4:
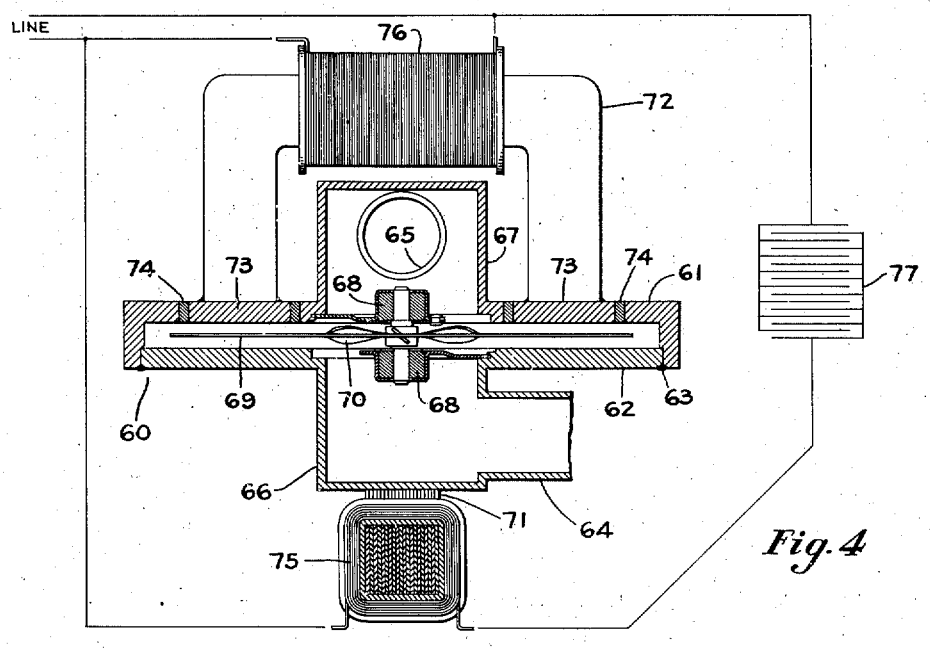
Figure 4 shows a vertical cross-sectional view of another form of gas circulator unit.
Figure 5:
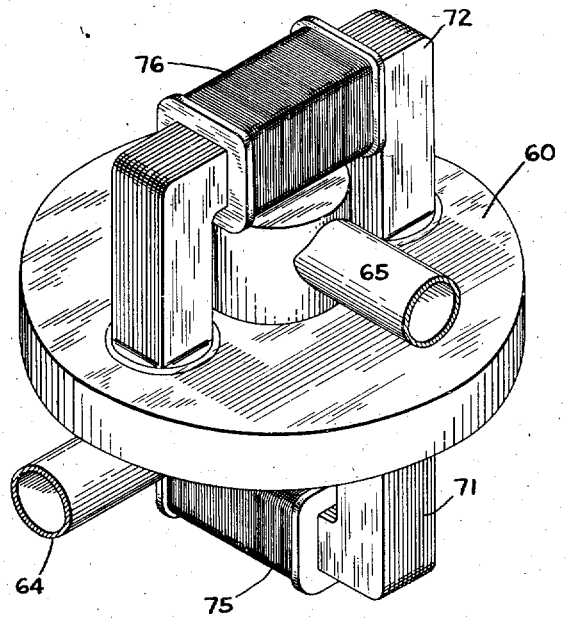
Figure 5 is a perspective view of the gas circulator unit of Figure 4.

In the embodiment shown in Figures 4 and 5, the electro-mechanical circulating unit generally indicated by the reference numeral 60 comprises upper and lower casing units 61 and 62 welded together at 63. It will of course be understood that gas circulator unit 60 can be substituted for circulator unit 18 in Figure 1. Inlet and outlet tubes 64 and 65, respectively, are integrally connected to extensions 66 and 67 of the casing sections 62 and 61, respectively. Mounted to rotate on suitable bearings 68 within the interior of the casing is an induction disc rotor 69 having fan blades 70 integrally connected therewith.

Located in the exterior of the casing wall are electro-magnetic core members 71 and 72 made of laminated magnetic material. The ends of these core members are welded to sections 73 of magnetic material forming portions of the casing wall separated from the remainder of the casing walls by rings 74 of non-magnetic material. The section 73 and the rings 74 of non-magnetic material are welded to each other and to the casing section 61 and 62. Field coils 75 and 76 are provided for the field cores 71 and 72, respectively. A condenser 77 is connected in series with field coil 75 and in parallel with field coil 76 so that when the coils are energized by an alternating current the magnetic flux excited by one coil will be displaced in phase from that excited by the other coil so as to produce in effect a rotating magnetic field whereby the induction disc 69 will be rotated which in turn will rotate the fan blades 70 and create a circulation of the gas in its circuit.

As in the other modifications it can be seen that the field cores extend through the casing walls and are separated from the remaining portion of the casing walls by non-magnetic material so as to provide a magnetic path for the flux generated by the field coils without undue magnetic flux leakage to other parts of the casing walls and the portions of the field cores which extend through the walls of the casing form a part of the casing walls to prevent the escape of gas therefrom under the high pressures within the interior of the system so that these portions of the field cores perform both a mechanical and an electrical function.

It is to be understood that according to this invention the gas circulator unit of Figures 4 and 5 may be substituted for that of Figure 1.

In absorption refrigerating systems of the type shown, the pressures throughout the entire system are substantially the same so that only slight force need be applied, sufficient only to overcome the friction of the inert gas circuit, to propel the gas in its circuit.

In all of the embodiments shown, it is within the purview of this invention to make the portion of the field core which extends through the walls of the system of laminated magnetic material.

In all of the modifications shown, the non-magnetic ring between the portions of the field core extending through the system walls and the remainder of the walls may be made of well known non-magnetic nickel chromium steel alloys.

While I have shown but a few embodiments of my invention, it is understood that these embodiments are to be taken as illustrative only and not in a limiting sense. I do not wish to be limited to the exact structure shown and described, but to include all equivalent variations thereof except as limited by the scope of the claims.

I claim:

1. A pump structure suitable for use in the inert gas circuit of an absorption refrigeration apparatus comprising a casing housing a vibratable diaphragm, a gas conduit communicating with said casing, a gas nozzle having a discharge portion co-axial with a part of said conduit and so arranged with respect to said diaphragm that vibration thereof will alternately withdraw gas from the lateral sides of the nozzle discharge and eject gas axially thereof, and means for actuating said diaphragm including an electromagnet having a core with a tapered end, a corresponding opening in said casing, and means securing said core in said opening and in operative position with respect to said diaphragm whereby said casing is sealed against the escape of gas.

2. A pump structure suitable for use in the inert gas circuit of an absorption refrigeration apparatus comprising a casing housing a vibratable diaphragm, a gas conduit communicating with said casing, a gas nozzle having a discharge portion co-axial with a part of said conduit and so arranged with respect to said diaphragm that vibration thereof will alternately withdraw gas from the lateral sides of the nozzle discharge and eject gas axially thereof and means for actuating said diaphragm including an electro-magnet having an outer shell and an inner core, said core having a tapered head, a correspondingly shaped but larger opening in the casing opposite the diaphragm, non-magnetic material filling the space between said tapered end and said opening, and an armature on said diaphragm opposite said opening whereby the electro-magnetic flux flows through said shell, said casing, said armature, and said inner core back to said shell.

3. In combination, an absorption refrigerating apparatus having an evaporator and an absorber, conduits connecting said evaporator and absorber to form a circuit for the circulation of inert gas between the evaporator and the absorber, and an electro-mechanical circulator for circulating the inert medium in its circuit comprising a casing forming a portion of the walls of said circuit, a movable element hermetically sealed within said walls, electro-magnetic means positioned outside said walls, said walls being divided into alternate circular sections of magnetic and non-magnetic material, one of said magnetic sections forming part of the circuit of said electro-magnetic means and said non-magnetic section preventing flux leakage from said electro-magnetic means into other parts of said inert gas circuit.

4. In combination, an absorption refrigerating apparatus having a boiler, an absorber, and an evaporator, conduits connecting said boiler, absorber and evaporator to form an inert gas circuit and a solution circuit, an inert gas in said inert gas circuit, an electro-mechanical circulating unit for circulating said inert gas in said inert gas circuit, said circulating unit comprising a rotary element hermetically sealed within the walls of said apparatus and electro-magnetic means outside said walls opposite said rotary element, said walls being so constructed as to form part of the magnetic flux path for said electro-magnetic means, said part being separated from other portions of the wall of said apparatus by non-magnetic material, and means connected to said inert gas circuit adjacent said unit and operable to by-pass liquid which may be present in said circuit around the unit and to said solution circuit.

5. In combination, an absorption refrigerating apparatus having an evaporator and an absorber, conduits connecting said evaporator and absorber to form a circuit for the circulation of inert gas between the evaporator and the absorber, and an electro-mechanical circulator for circulating the inert gas in its circuit comprising a casing forming a portion of the walls of said circuit, a movable element hermetically sealed within said walls, electro-magnetic means positioned outside said walls, said walls being divided into alternate circular sections of magnetic and non-magnetic material, one of said magnetic sections forming part of the flux circuit of said electro-magnetic means and said non-magnetic section preventing flux leakage from said electro-magnetic means into other parts of said inert gas circuit, and means connected to the inert gas circuit adjacent said unit at a point between the unit and said evaporator and operable to by-pass liquid around the unit.

6. In combination, an absorption refrigeration apparatus including an absorber, an evaporator, an inert gas circuit between said absorber and evaporator including a gas heat exchanger, an electro-mechanical gas circulator unit in said gas circuit at a point between said heat exchanger and said absorber, said unit comprising a rotary element within said circuit, electro-magnetic means for actuating the rotary element located outside said circuit and opposite said rotary element, a portion of the walls of said circuit forming part of the magnetic flux path between said electro-magnetic means and said rotary element, said part being separated from other wall portions of said circuit by non-magnetic material, and liquid conveying means connected to the inert gas circuit at a point between said unit and said heat exchanger for by-passing liquid around the unit and thereby preventing said liquid from contacting said rotary element.

7. In combination, an absorption refrigerating apparatus having an evaporator and an absorber, conduits connecting said evaporator and absorber to form a circuit for the circulation of inert gas between the evaporator and the absorber, and an electro-mechanical circulator for circulating the inert medium in its circuit comprising a casing forming a portion of the walls of said circuit, electro-magnetic means having oppositely facing polar projections positioned outside said walls, an inductive rotatable element within said walls and positioned intermediate of said oppositely facing polar projections, said casing walls including magnetic material beneath said projections and non-magnetic material substantially magnetically isolating said projections from the remainder of said walls, said magnetic material forming part of the circuit of said electro-magnetic means and said non-magnetic material preventing flux leakage from said electro-magnetic means into other parts of said inert gas circuit.

8. In combination, an absorption refrigerating apparatus having an evaporator and an absorber, conduits connecting said evaporator and absorber to form a circuit for the circulation of inert medium between the evaporator and the absorber, and an electro-mechanical circulator for circulating the inert medium in its circuit comprising a casing forming a portion of the walls of said circuit, said casing walls being formed of magnetic material and non-magnetic material, said non-magnetic material being positioned so as to substantially magnetically isolate the magnetic material from the remainder of the casing walls, a movable element within said casing walls adjacent said magnetic material, electro-magnetic means formed separately from said casing walls for actuating said movable element to circulate the inert medium, said means having polar projections positioned against said magnetic material whereby said magnetic material forms a part of the circuit of said electro-magnetic means and said non-magnetic material prevents flux leakage from said electro-magnetic means into other parts of said inert gas circuit.

9. In combination, an absorption refrigerating apparatus having an evaporator and an absorber, conduits connecting said evaporator and absorber to form a circuit for the circulation of inert medium between the evaporator and the absorber, and an electro-mechanical circulator for circulating the inert medium in its circuit comprising a casing forming a portion of the walls of said circuit, said casing walls being formed of magnetic material and non-magnetic material, said non-magnetic material being positioned so as to substantially magnetically isolate the magnetic material from the remainder of the casing walls, a movable element within said casing walls adjacent said magnetic material, electro-magnetic means formed separately from said casing walls for actuating said movable element to circulate the inert medium, said means having polar projections positioned against said magnetic material whereby said magnetic material forms a part of the circuit of said electro-magnetic means and said non-magnetic material prevents flux leakage from said electro-magnetic means into other parts of said inert gas circuit, said magnetic and non-magnetic material being welded to each other and to the walls of the apparatus to form a hermetically closed system.

HOWARD L. SCHUG.